March 5, 1935.   M. D. NICHOLSON   1,993,307
TEST PLUG
Filed Aug. 7, 1933   2 Sheets-Sheet 2

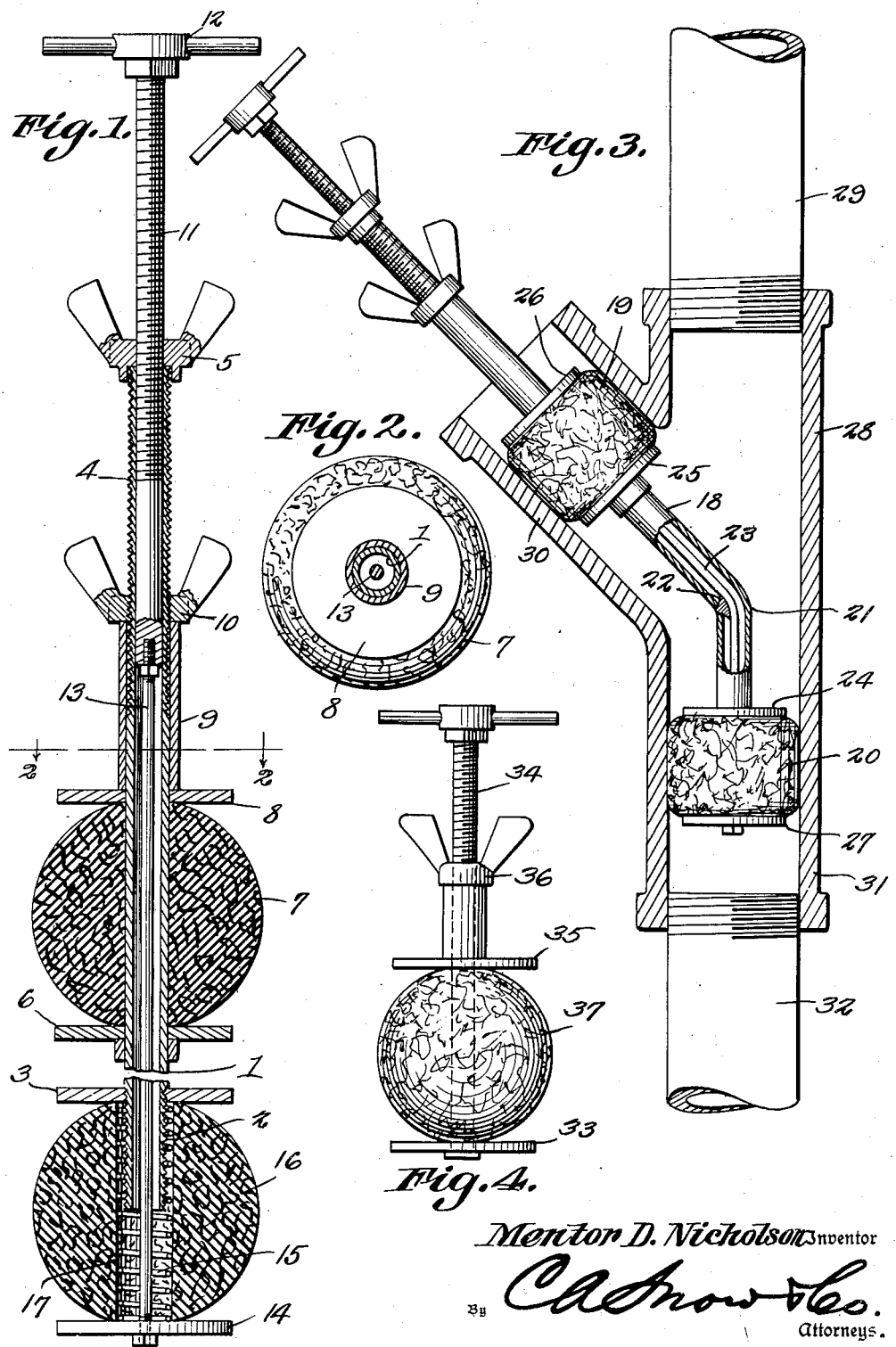

Mentor D. Nicholson
Inventor

By C.A.Snow & Co.
Attorneys.

Patented Mar. 5, 1935

1,993,307

UNITED STATES PATENT OFFICE 1,993,307

TEST PLUG

Mentor D. Nicholson, Cleveland, Ohio

Application August 7, 1933, Serial No. 684,078

2 Claims. (Cl. 137—76)

This invention relates to a testing plug for use in testing and repairing service pipes such as sewer and gas pipes, and is a continuation of an application filed by me on Dec. 19, 1932, Serial Number 648,011.

It is an object of the invention to provide a tool of this character utilizing a compressible ball of sponge rubber which will conform readily to the contours of pipe surfaces which are rough or irregular and will afford a more extensive contact area when compressed than can be attained by the use of other kinds of plugs.

Another object is to provide a compressible plug which will not crack, tear or become otherwise damaged through contact with a rough pipe surface.

A still further object is to provide a tool utilizing spaced compressible plugs which can be separately compressed by the actuation of operating means located at a convenient point outside of the pipe, thereby to prevent the flow of gas or water in two directions while repairs or tests are being made.

With the foregoing and other objects in view which will appear as the description proceeds, the invention consists of certain novel details of construction and combinations of parts hereinafter more fully described and pointed out in the claims, it being understood that changes may be made in the construction and arrangement of the parts without departing from the spirit of the invention.

In the accompanying drawing the preferred forms of the invention have been shown.

In said drawing:

Figure 1 is a longitudinal section through the test plug, a portion being broken away.

Figure 2 is a section on line 2—2 Figure 1.

Figure 3 is an elevation, partly in section, of a modified form of test plug seated in a Y-fitting, which is in section.

Figure 4 is an elevation of a further modification.

Figure 5:
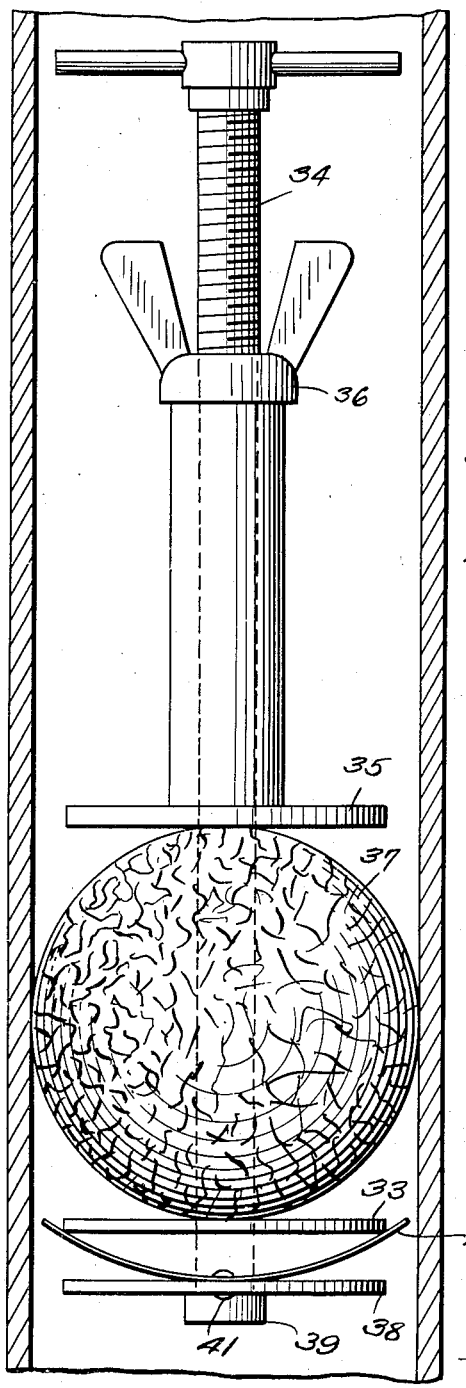
Figure 5 is an elevation of another form of test plug in position in a pipe.

Referring to the figures by characters of reference 1 designates a tubular core one end of which is screw threaded, as at 2, for engagement by a stationary clamping disk 3.

The other end portion of the core is also exteriorly screw threaded as shown at 4 and is engaged by a swiveled nut 5.

A stationary clamping disk 6 is fixedly mounted on the core 1 and is spaced from disk 3 any desired distance. This disk 6 constitutes an abutment for a solid ball 7 formed of sponge rubber. The core 1 extends diametrically through the ball and is engaged by a slidable clamping disk 8 against which abuts a sleeve 9 slidable on core 1. A feed nut 10 is mounted on the threaded portion 4 of the core and thrusts against sleeve 9. Obviously by rotating this nut in one direction the disk 8 can be forced toward disk 6 so as to compress the ball 7 and cause it to expand and snugly grip the surrounding surface of a pipe in which it might be seated.

The nut 5 is engaged by screw threaded stem 11 slidable in the core 1. A head 12 is securely attached to the outer end of this stem while the inner end, which is located in the core 1, has a rod 13 secured to it and extending from that end of the core remote from nut 5. The projecting end of the rod is suitably joined to a movable clamping disk 14 and interposed between this disk and the disk 3 is a coiled spring 15 one end of which is mounted on the adjacent end of core 1 while the two ends of the spring bear against disks 3 and 14 respectively. A solid ball 16 of sponge rubber is interposed between the disks 3 and 14 and has a diametrical opening 17 in which the spring 15 and the end of core 1 are seated.

The tool is adapted to be inserted into a pipe through an opening provided therein and when the balls 7 and 16 have been brought to desired positions in the pipe they are separately compressed so as to be expanded into snug engagement with the surface of the pipe. Ball 7 is expanded merely by rotating nut 10 so as to force sleeve 9 against disk 8. Ball 16 is expanded by rotating nut 5 to pull through rod 13 upon disk 14.

By using two balls it becomes possible to provide double protection against blow-outs and, should the plug be used in a T-fitting joining pipes extending at angles to each other, one ball can be expanded to close the opening in the fitting while the other ball can be used for closing the pipe alined with the opening.

Under some conditions, as where the test outlet in a fitting does not aline with a pipe, it would not be possible to use a test plug formed as shown in Figure 1. Under such conditions a plug formed as in Figure 3 can be employed. This modified form of tool is the same as that heretofore described except that the core 18 has a bend between the balls 19 and 20, as indicated at 21. A bearing 22 is provided in the core at the angle of the bend and is slidably engaged by rod 23. This rod, which corresponds with rod 13, is flexible and when pulled taut, will ride over the bearing 22.

The means for separately compressing the balls is the same as that heretofore described and includes the stationary disks 24 and 25 and the movable disks 26 and 27. In Figure 3 the test plug has been shown seated in a Y-fitting 28 so that gas or other fluid flowing into the fitting from pipe 29 cannot escape through either the arm 30 or the arm 31. Thus tests or repairs can be made either in pipe 29 or in the opposed pipe 32.

Figure 6:
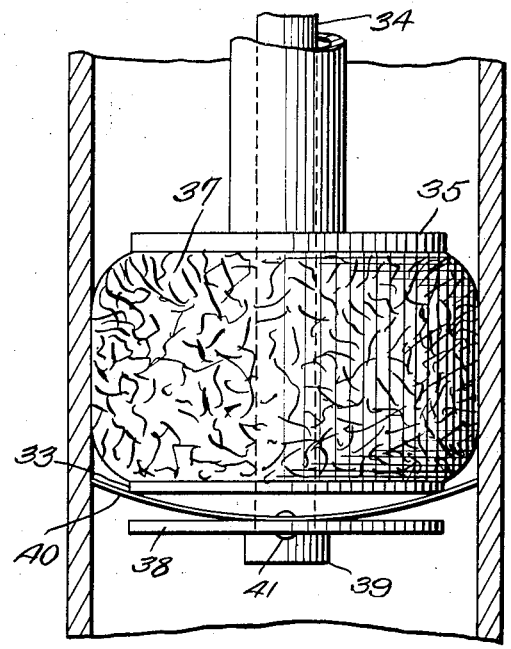
Figure 6 is a similar view showing the springs subjected to pressure and forced into locking engagement with the pipe.
Figure 7:
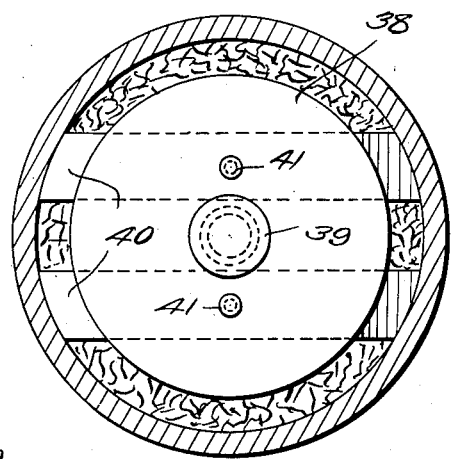
Figure 7 is a bottom plan view of the plug shown in Figures 5 and 6.

Under some conditions a single ball can be used. This modified form has been shown in Figure 4 and consists of a clamping disk 33 having a threaded stem 34 and not clamping disk 35 slidable on the stem and adjustable by a nut 36. The sponge rubber ball 37 is mounted on the stem and between these disks. In Figures 5, 6 and 7 a supplemental disk 38 is supported by the head 39 of the stem 34 and the two disks 33 and 38 are held apart by bow springs 40 attached at 41 to disk 38. In this structure the ball 37 will be compressed by the movement of the disks toward each other and such movement also acts to flatten the springs, forcing their ends into engagement with the wall of the pipe so as to form an efficient lock or backing for the plug.

Importance is attached to the fact that in every case the balls used are formed of sponge rubber. These balls will not crack as readily as balls made of other kinds of rubber. Furthermore they are advantageous because they compress more readily and flatten out to form pipe gripping surfaces of much greater areas than can be obtained by the use of other kinds of solid rubber balls. The sponge rubber adapts itself to rough and irregular surfaces in pipes much more efficiently than do the usual rubber balls.

It will be obvious, from the foregoing, that the present tool is far superior to those commonly employed.

What is claimed is:

1. A test plug for insertion in a pipe, including a screw-threaded stem, a disk mounted on one end portion thereof, a clamping disk mounted to slide upon the stem, a bow-spring interposed between said disks and compressible thereby to project the ends of the spring radially beyond the disks into contact with the inner surface of said pipe to hold the plug against movement longitudinally of the pipe under pressure applied to one end thereof, a second clamping disk upon the stem, a sleeve slidable on the stem for exerting thrusts against said second clamping disk, means for adjusting the sleeve along the stem, and a sponge rubber ball on the stem and between the clamping disks.

2. A test plug for insertion into a pipe, including a screw-threaded stem, a disk mounted on one end portion thereof, a clamping disk mounted to slide upon the stem, a means interposed between said disks and compressible thereby to project portions of said means radially beyond the disks into biting contact with the inner surface of the pipe, a second clamping disk upon the stem, a sleeve slidable on the stem for exerting thrusts against said second clamping disk, means for adjusting the sleeve along the stem, and a resilient member on the stem and adapted to be compressed between the clamping disks and expanded radially thereby.

MENTOR D. NICHOLSON.